April 16, 1935.   N. E. LOOMIS   1,997,938
PROCESS OF REFINING OILS
Filed Jan. 6, 1932
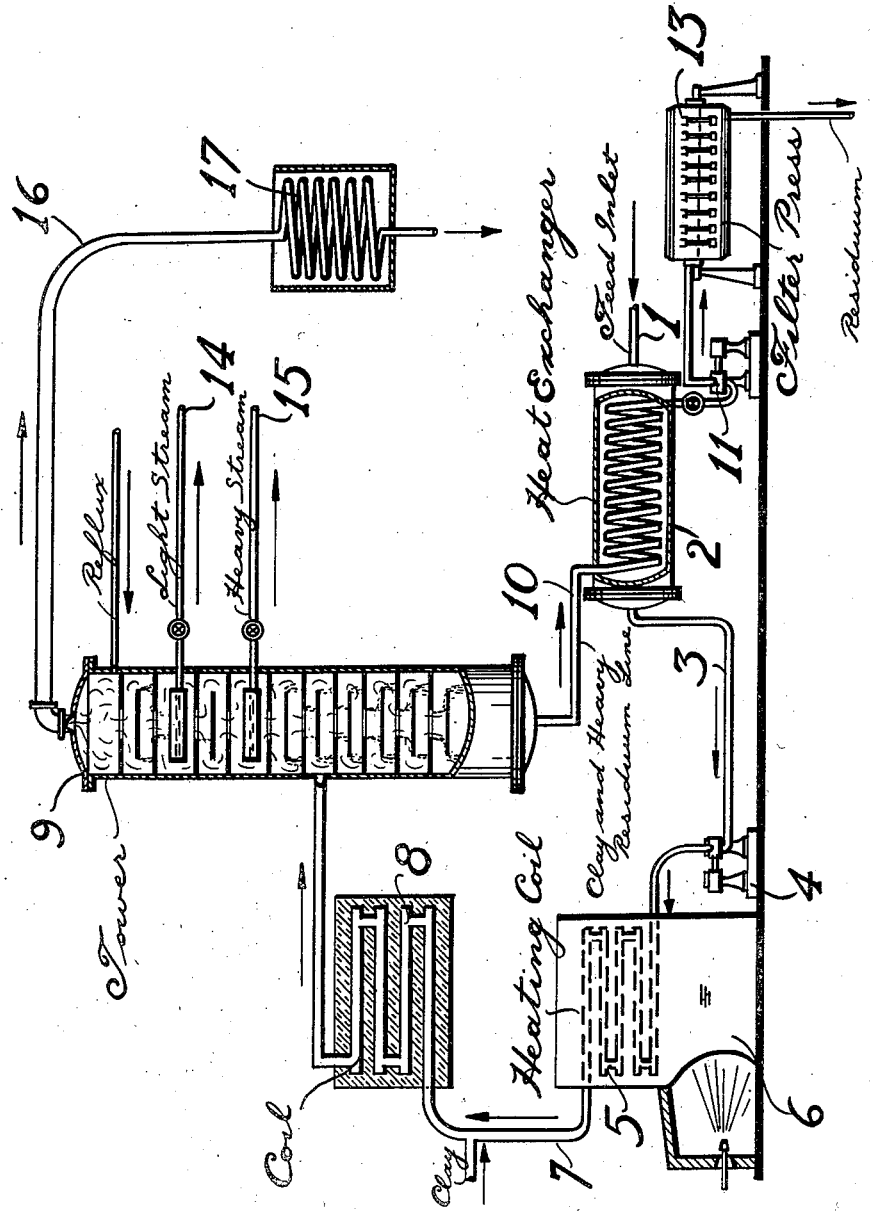

Patented Apr. 16, 1935

1,997,938

UNITED STATES PATENT OFFICE 1,997,938

PROCESS OF REFINING OILS

Nathaniel E. Loomis, Westfield, N. J., assignor to Standard Oil Development Company, a corporation of Delaware Application January 6, 1932, Serial No. 584,965

2 Claims. (Cl. 196—79)

This invention relates to a process for refining oils and more specifically to certain improvements in those processes in which an oil is treated with clay while undergoing distillation.

There are processes known in the art in which an oil containing light and heavy fractions is mixed with the treating clay passed through a heat exchanger and/or heating coils and discharged into a tower in which distillation and fractionation take place. Such processes are subject to the difficulty of the clay depositing in the heat exchangers and of an excessive erosion on the return bends of the pipe still and on the feed pumps.

I have discovered that these difficulties can be eliminated by first passing the oil to be treated through the heat exchanger and/or heating coil, then mixing the treating clay with the heated oil and passing the slurry of oil and clay through a zone of uniform temperature, consisting of heat insulated coils, into the distillation and fractionation tower. By this improvement not only the above difficulties are eliminated but also the further advantage is obtained that the oil clay mixture is held at a constant treating temperature for a controlled length of time. In the case where the clay is fed with the oil through the heating coil the temperature is gradually rising and the time during which the clay is in contact at optimum temperature is entirely a function of the coil design from heat input standpoint.

The invention will be fully understood from the following description when read in conjunction with the drawing, the sole figure of which is a diagrammatic side elevation partly in section of the apparatus used in carrying out the invention.

Referring to the drawing the oil is fed through line 1 to heat exchanger 2 from which it is passed through line 3 by means of pump 4 to the heating coil 5 placed in a furnace 6. The oil is raised to the desired temperature in the heating coil after which it is admixed with clay from line 7 and passed through heat insulated coil 8 into the distillation and fractionation tower 9. If so desired a valve may be provided in the line connecting coil 8 with the tower 9. The tower is preferably maintained under vacuum by means (not shown) well known in the art. In the tower the light and middle fractions of the oil to be refined are distilled off while the slurry of heavy residuum and clay is removed by means of pump 11 through line 10 passing through the heat exchanger 2. The residuum is separated from the clay in filter press 13 and then passed through a final cooler to storage tank (not shown). A light and a heavy side stream are removed through lines 14 and 15, respectively, and are passed through coolers to storage tanks (not shown). Part of the light side stream may be returned to the top of the tower as reflux. A light product is removed overhead through line 16, condensed in condenser 17 and sent to storage (not shown).

The most advantageous application of my process is to the production of lubricating oils from topped crudes or other petroleum oils.

The treating clay may be of the variety known as fuller's earth, such as Attapulgus fines, or it may be acid treated clay or other solid adsorptive material capable of removing coloring bodies from the oil. The temperature to which the oil is heated in coil 5 may vary within large limits; it should be high enough to remove from the oil the light products but should not be so high that the oil undergoes a substantial amount of cracking. The temperature of the oil at the outlet of heating coil 5 is high enough to maintain the oil clay mixture in the heat insulated coil 8 at a treating temperature of say 400°–700° F. and preferably at 500°–650° F. The amount of solid adsorptive material admixed to the oil through line 7 also varies within large limits. When Attapulgus fines are used this amount is usually within ⅛ to ⅜ lbs. per gallon of feed.

The following example will illustrate my process:

Ranger crude of 38.9° A. P. I. gravity was treated with 16 pounds of 98% sulfuric acid per 42 gal. barrel. 90% of the acidity was neutralized with caustic and the stock distilled to 70% bottoms, taking 30% gasoline overhead. The reduced crude thus obtained was treated according to the present method using ¼ pound of Attapulgus fines per gallon of reduced crude. An absolute pressure of 50 millimeters mercury was maintained in tower 9 with a flash temperature of 660° F. There were obtained as final products 32% of bottoms, 29% of paraffin distillate as bottom side stream having a viscosity of 65 seconds Saybolt at 100° F., 16% of gas oil as top side stream and 23% of refined oil as overhead product. The bottoms had the following inspection:

| | |
|---|---|
| Gravity | 23.4° A. P. I. |
| Flash | 510° F. |
| Viscosity at 210° F | 137 seconds Saybolt |
| Pour | 70° F. |
| Color | 1 Robinson |

My process is not to be limited by any theoretical considerations nor by the details and the example given for the purpose of illustration but only by the following claims in which it is my intention to claim all novelty inherent in the process.

What I claim is:

1. Process of refining oil which comprises passing the oil in the absence of clay in a confined stream through an elongated heating zone of narrow cross section, admixing a solid adsorbent material with the oil issuing from the heating zone and passing the slurry of oil and adsorbent material through a zone of uniform temperature, admitting the slurry of oil and solid adsorbent material from the zone of uniform temperature into a distillation and fractionation zone, distilling off light products in said distillation and fractionation zone, removing the residual oil with the clay from said last mentioned zone and separating the residual oil from the clay.

2. The process of refining oil which comprises passing the oil in the absence of clay in a confined stream through an elongated heating zone of narrow cross section, admixing a solid adsorbent material with the oil issuing from the heating zone and passing the slurry of oil and solid adsorbent material in a confined stream through an elongated zone of narrow cross section maintained at a uniform temperature, admitting the slurry of oil and solid adsorbent material from the elongated zone of uniform temperature into a distillation and fractionation zone, distilling off light products in said distillation and fractionation zone, removing the residual oil with the clay from said last mentioned zone, and separating the residual oil from the clay.

NATHANIEL E. LOOMIS.